May 18, 1926.　　　　　　　　　　　　　　　　　1,585,302
J. G. MACLAREN
CARRIER DISTRIBUTOR
Original Filed March 26, 1920　　5 Sheets-Sheet 1

J. G. Maclaren
Inventor

May 18, 1926.

J. G. MACLAREN

1,585,302

CARRIER DISTRIBUTOR

Original Filed March 26, 1920   5 Sheets-Sheet 2

INVENTOR.
J. G. Maclaren

Patented May 18, 1926.

1,585,302

UNITED STATES PATENT OFFICE.

JAMES G. MACLAREN, OF MAMARONECK, NEW YORK, ASSIGNOR, BY MESNE ASSIGN-
MENTS, TO THE LAMSON COMPANY, A CORPORATION OF MASSACHUSETTS.

CARRIER DISTRIBUTOR.

Application filed March 26, 1920, Serial No. 369,084. Renewed March 9, 1925.

My invention relates to apparatus for the distribution or sorting of containers, hereinafter referred to as "carriers" according to different classes to which they belong. My invention is more especially, though not exclusively, concerned with carrier distributor means intended for use in connection with a pneumatic despatch system in which carriers of more than one class are transmitted through a common transit tube and are sorted according to their classes by selecting means adapted for cooperation with carriers differing from one another in form, dimension or other characteristic which determines their class, and wherein the sorted carriers are then delivered at the station where the sorting takes place or transferred by means of a pneumatic despatch tube, belt conveyor, or other means, to another station or stations for further sorting or delivery, or both.

My invention will be best understood by reference to the following description when taken in connection with the accompanying drawings, while its scope will be more particularly pointed out in the appended claims.

Referring to the drawings, Figs. 1 to 6 illustrate carriers of six different types, the carriers illustrated being those in general use in retail stores.

Figure 1:
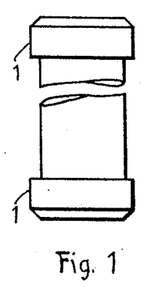
Figs. 1 to 6, inclusive, show six types of carrier that may be despatched through a common tube to six different locations or stations.
Figure 2:
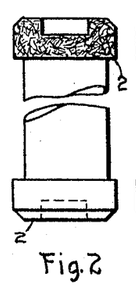

The carrier shown in Fig. 1 has heads consisting of circular buffers each provided with a flat end surface, this carrier being known as a "flat head" carrier. The carrier illustrated in Fig. 2 is provided with heads having circular recesses at their centers and is hereinafter referred to as a "recessed head" carrier. The carrier shown in Fig.

Figure 4:
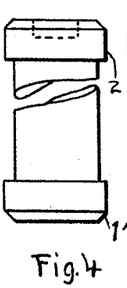
Figure 5:
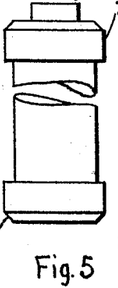
Figure 6:
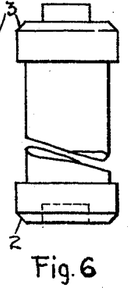

3 has a circular plug projecting from the center of each head and is hereinafter referred to as a "plugged" carrier. Various combinations of the above types of heads are illustrated in Figs. 4 to 6 inclusive. By using the six forms of carrier here shown in connection with the improved distributing mechanism forming the subject matter of the present invention, a sales person may dispatch carriers direct to any of six departments, such for example as the cashier, the credit authorizer, the stock room, the superintendent, the head cashier, and the delivery room.

Referring to Figs. 7 to 11, a preferred form of distributor is illustrated which comprises a hollow housing 4 bored at 27 in the usual manner to provide an entrance passage adapted to receive the end of a transit tube through which carriers arrive for distribution. This housing is provided with two outlets 28 and 29 respectively. Both of these outlets are shown as adapted to receive the ends of transmission tubes in the usual manner.

Figure 7:
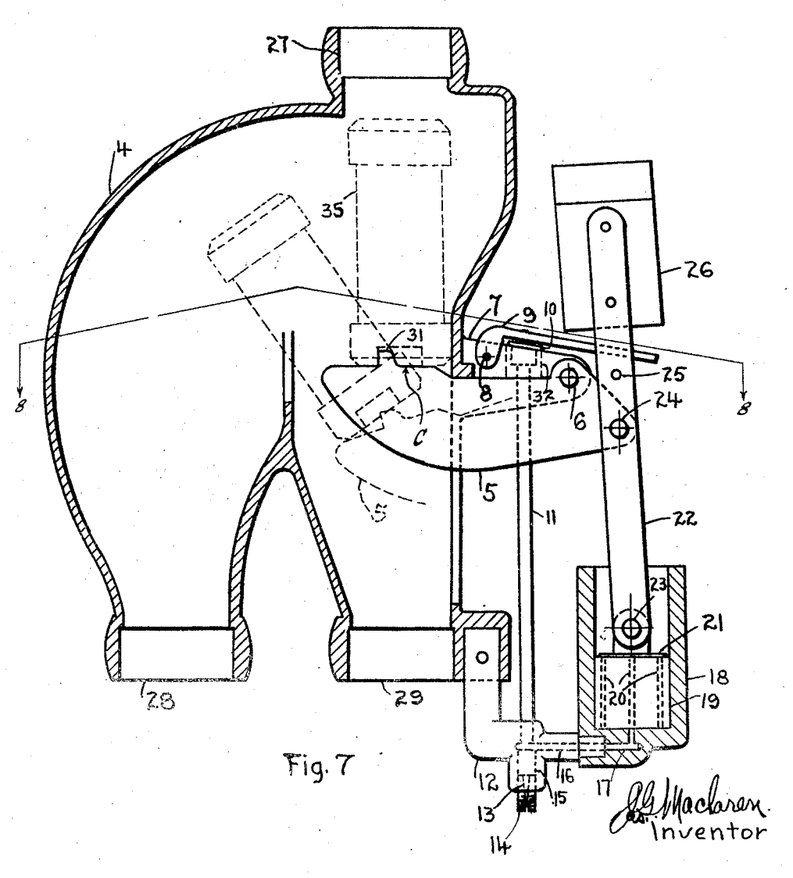
Fig. 7 is a vertical section, partly in elevation, of a mechanism for making a primary selection.
Figure 8:
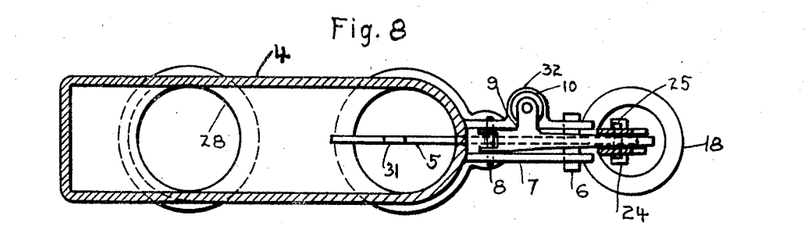
Fig. 8 is a section on the line 8—8 in Fig. 7.
Figures 9, 10, 11:
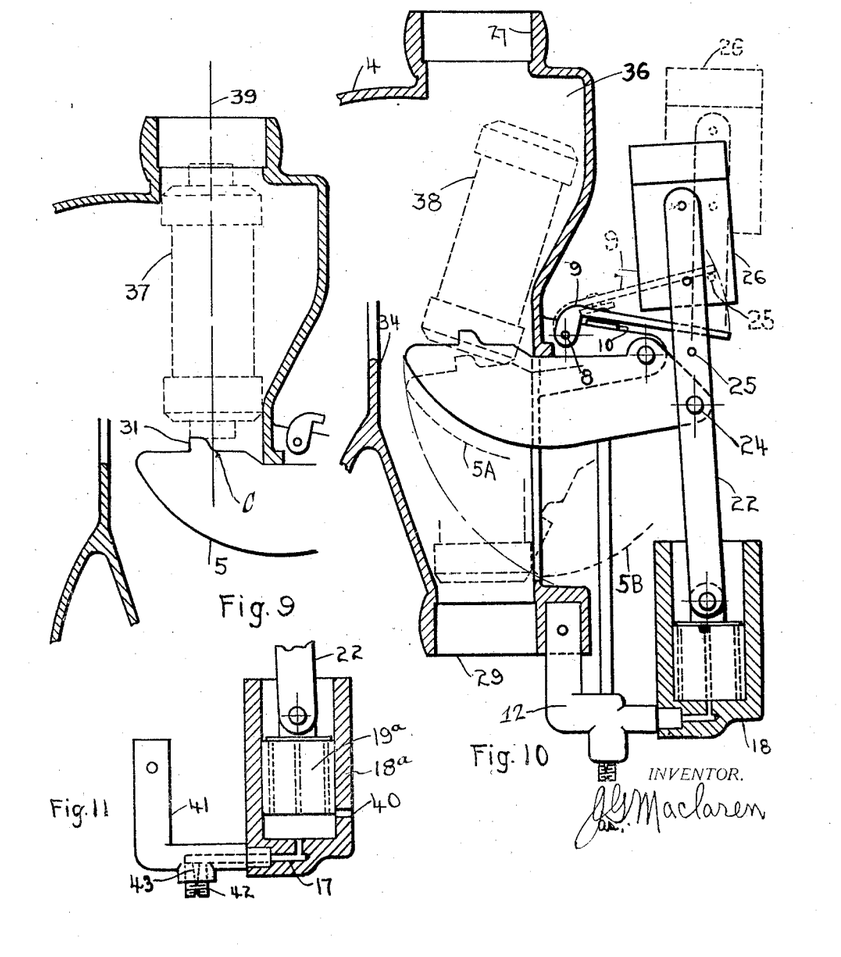
Fig. 9 is a fragmentary vertical section illustrating certain of the parts shown in Fig. 7, and an arriving carrier of the type shown in Fig. 3.
Fig. 10 is a fragmentary vertical section showing certain of the parts illustrated in Fig. 7, the parts being in the position which they will assume upon the arrival of a carrier of the type shown in Fig. 1.
Fig. 11 is a vertical section illustrating a modified form of dash pot which may be substituted for that shown in Fig. 10.

A one-piece gate 5 is pivoted to swing freely in a vertical plane upon a pivot pin 6 conveniently supported upon a pair of ears 7 projecting from the outer surface of the housing 4. The side wall of the housing is furnished with a vertical slot through which the end of the gate 5 projects into the interior of the housing. This projecting end of the gate is furnished with a substantially flat upper edge provided with an upstanding lug or projection 31 at a point about midway its length. This lug is positioned eccentrically to the axial line 39 of the passage 27 as indicated in Fig. 9. The rear end of the gate 5 is pivotally connected to a pair of parallel arms 22 by means of a pin 24. A counter-weight 26 is disposed between the upper ends of the arms 22 and is secured thereto in any suitable manner, while the lower ends of the arms 22 are pivotally connected at 23 to a piston 19 working in a dashpot cylinder 18 which is carried by a bracket 12 secured to the housing 4 in any suitable manner.

A valve handle 9 is pivoted upon a pin 8 supported by the ears 7 and has attached to it a valve disk 10 which normally seals a chamber in a boss 32 projecting from one of the ears 7. This chamber communicates with the dash-pot cylinder 18 at a point below the piston 19 by means of the tube 11, a passage 16 in the bracket 12, and a passage 17 in the bottom of the cylinder 18. The counter-weight 26 is sufficient normally to hold the parts in the position indicated in full lines in Fig. 7, the valve 10 being closed, but when the gate is swung downwardly toward the dotted line position indicated in Fig. 7, a pin 25 extending from one to the other of the arms 22 engages the valve handle 9 and raises the valve 10, admitting air at atmospheric pressure to enter the lower end of the cylinder 18.

A passage 15 leads in through the bracket 12 to the passage 16 and this passage 15 is plugged by the regulating valve 14 which is provided with a V-groove 13 to admit a variable amount of air to the space beneath the piston. By backing out the valve plug 14 air is more freely admitted, while the volume admitted is restricted by screwing in the plug, thus providing for the control of the speed of upward travel of the piston 19 and of the parts to which it is attached.

Although the valve 10 can act as a check valve permitting the free escape of air from below the piston 19 when the latter descends, I prefer to insure the free downward movement of the piston by the provision of a series of escape holes 20, through the body of the piston, which are covered by a check valve 21.

When a carrier having a recessed head enters the inlet passage 27 it continues its progress until its head encounters the upper edge of gate 5 as indicated in Fig. 7. The projection 31 enters the recess of the head and as the projection 31 is less in height than the depth of the recess, the force of the impact of the carrier is distributed over the straight edge of the gate proper at opposite sides of the projection, the net effect, theoretically at least, being substantially the same as though the entire weight and force of impact of the carrier acted through the vertical axis of its center of gravity substantially at the point C of the gate, such point being nearer to the axis 6 of the gate than is the projection 31. The impact is instantly followed by a slight downward swing of the gate which causes the upper edge of the latter to incline to a greater and greater degree so that the point of application of the force of impact tends constantly to move nearer to the axis 6, thus shortening the moment arm with which the force acts to swing the gate in opposition to the inertia of the mass of weight 26, enforced by the retarding effect of the dash pot.

Due to the inertia of the weight 26 and the restraining action of the dash pot, the gate acts very much like a fixed eccentrically disposed abutment when engaged by a recessed head carrier, thus tending to tip the carrier laterally before the gate has descended to a substantial extent. The slow continued downward movement of the gate, if for any reason the initial impact is ineffective to topple the carrier into the outlet, results in producing the desired effect by shifting the point of support of the carrier from beneath its center of gravity, so that whether instantaneously upon arrival, or after a very short but appreciable period of time, the carrier is bound to tip over to the position indicated in dotted lines in Fig. 7 and fall into the mouth of the outlet opening 28.

As indicated in Fig. 9, a carrier having a plugged head, as well as one having a flat head, will engage the projection 31 of the gate instead of the straight upper edge of the gate proper. As above described, this projection is offset as respects the axial line 39 of an approaching carrier so that a carrier engaging the projection tends to tip into the position indicated in dotted lines at 38, Fig. 10. This tendency to tip is not substantially changed by any initial or subsequent inclination of the upper surface proper of the gate and is sufficient to prevent accidental bouncing of the carrier into the outlet 28. As the point of contact of the carrier with the projection 31 is at a greater distance from the axis 6 of the gate than is the point C of effective contact of a carrier having a recessed head, such a plugged or flat headed carrier acts with a greater turning moment to swing the gate. The gate thus swings downward with relative rapidity and as it begins to move the carrier leans away from the outlet 28 and its upper end is received in a guiding recess 36. This avoids any chance of tipping of the carrier in the opposite direction until its lower end has safely entered the outlet 29. As the gate 5 moves down under the weight and momentum of such a plugged or flat headed carrier, the pin 25 comes into engagement with the valve arm 9 and opens the valve so that the resistance of the dash pot is eliminated and the gate swings very freely down until it is entirely clear of the housing 4, thus permitting the carrier to pass on freely through the outlet 29. As soon as the carrier has passed the gate returns quickly to its normal position.

In some instances it may be desirable to omit the valve 10, valve handle 9, and pin 25, and to employ the simpler arrangement illustrated in Fig. 11. I prefer, however, to employ the valve 10 and its associated parts, for by bending the handle 9 and adjusting the plug 14 a ready method is provided for regulating the retarded or timed movement of the gate 5.

When the distributor is installed under conditions such that the carriers enter it without excessive force the arrangement shown in Fig. 11 can be employed to advantage. The device shown in the latter figure comprises a bracket 41 intended to be substituted for the bracket 12 above described. This bracket 41 is provided with a passage controlled by a regulating plug 42 having a groove 43 for the admission of air. The dash-pot cylinder 18ª is provided with an opening 40 in its side wall at a suitable point above its lower end and after the piston 19ª has been raised to a sufficient extent this opening 40 is uncovered permitting the free admission of air and thus allowing the piston to move freely through the rest of its travel.

In either of the constructions shown in Figs. 10 and 11 the controlling plug or valve may be omitted if desired, or such plug may be withdrawn completely, giving free access at all times to the lower end of the cylinder. Likewise, under certain conditions the dash pot may be wholly dispensed with, the inertia of the weight 26 being depended upon to provide the necessary retarding effect. In such case, the device may be simplified by attaching the weight 26 directly and preferably integrally, to the lever 5.

In order to provide a still greater turning force for overcoming the inertia of the weight 26 and the dash pot, those carriers, that is to say, carriers having plugged or flat heads, which are intended to swing the gate out of their path and continue on through the outlet 29 may be made heavier than carriers having recessed heads which are intended to topple out through the outlet 28.

The above described distributing apparatus separates carriers having recessed heads from those having plugged and flat heads. To separate the plugged and flat head carriers an arrangement such as shown in Figs. 12 to 16 is preferably provided.

Figures 12, 13, 14, 15, 16:
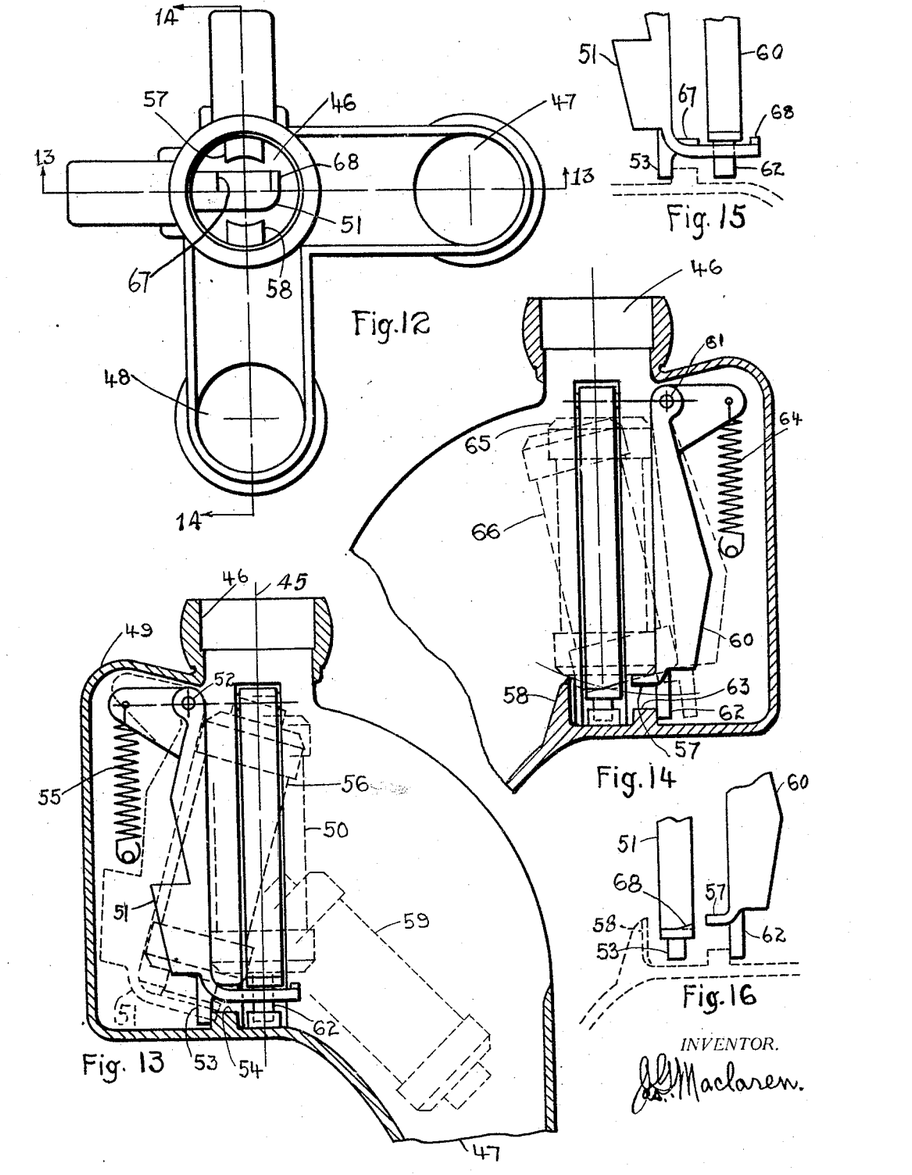
Fig. 12 is a plan view illustrating a further form of carrier sorting device.
Fig. 13 is a vertical section taken on the line 13—13 of Fig. 12 and shows the position of the parts when delivering a carrier of the type illustrated in Fig. 3.
Fig. 14 is a vertical section taken on the line 14—14 of Fig. 12 and shows the position of the parts when delivering carriers of the type illustrated in Figs. 1, 2 or 4.
Fig. 15 is a fragmentary detail view of the lower ends of the cradles as they appear in Fig. 14.
Fig. 16 is a fragmentary detail view of the lower ends of the cradles as they appear in Fig. 14.

This apparatus comprises a housing 49 having an inlet 46 adapted to receive carriers from the outlet 29 of the distributing apparatus just described. Pivoted upon a pin 52 in the housing 49 is a cradle 51 which is counter-weighted to swing toward the center line 45 of the passage 46 and which is also urged toward this position by a spring 55. The movement of the cradle in this direction is limited by engagement of the bottom of the cradle with a stop 54 projecting up from the bottom of the housing.

At substantially right angles to the cradle 51 a second cradle 60 is provided, such cradle being pivoted upon the pin 61 and counter-weighted in the same way as the cradle 51. The spring 64 urges the cradle 60 toward the center line of the carrier passage, the movement of the cradle being limited by a projection 62 which engages a stop 63.

The only material difference between the cradles 51 and 60 consists in the shelves or extensions of the cradles upon which the carriers are received. The cradle 60, (Figs. 14 and 16), has a short extension or arm 57 adapted to engage a flat headed carrier at one side only of its axis. The cradle 51 has a longer extension provided with spaced upwardly projecting bosses 67 and 68. The extensions of the two cradles are so relatively located that the plug of a plugged head carrier may engage the cradle 51 without touching the extension 57 of the cradle 60. A boss 58, Figs. 12 and 14, projects up from the floor of the housing 49 at a point substantially opposite to the extension 57 of the cradle 60, such boss terminating at a point slightly below the level of the extension 57.

When a carrier having a flat or recessed head enters the inlet 46 its head engages the extension 57, and due to the eccentric engagement of the carrier with said extension tends to topple over into the outlet 48. As the cradle 60 has considerable inertia, which in effect is increased by the spring 64, it reacts to the impact of the carrier almost like a fixed abutment, so that the carrier probably begins to rotate about its point of contact with the extension 57 at the very instant of impact. Immediately, however, forces are set up tending to swing the cradle and as the cradle swings the tipping of the carrier is thereby accelerated since movement of the cradle removes the point of support of the carrier further and further from beneath the center of gravity of the carrier until the carrier turns completely over and enters the outlet 48. As the carrier tips, its heads engage the wedge-like bosses 67 and 68 on the extension of the cradle 51 which provide a pivotal axis about which the carrier may swing.

When a plugged carrier enters through the inlet passage 46 its projecting plug will engage the extension of the cradle 51 before its head strikes the extension 57 of the cradle 60. Although the point of contact of the plug is concentric with the axis of the carrier, such point of contact of the plug with the cradle is disposed laterally with respect to the pivot 52 of the cradle so that forces are immediately set up tending to swing the cradle toward the dotted line position of Fig. 13. This eventually results in tipping the carrier into the outlet 47. As the carrier starts to tip it engages the boss 58 and the extension 57 of the cradle 60 which provide a pivotal axis about which it may turn.

Figures 17, 18:
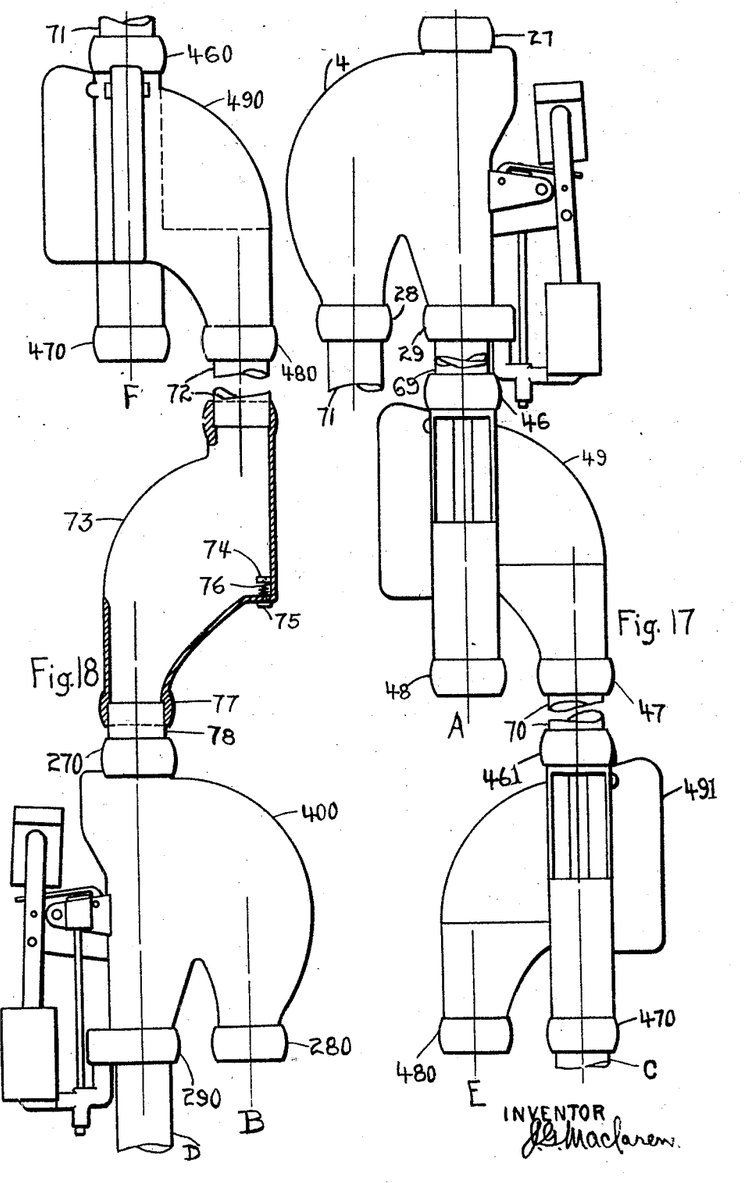
Fig. 17 shows an assemblage of distributing devices adapted to distribute carriers in four directions.
Fig. 18 shows a further assemblage of distributing devices intended to receive carriers from the first distributing unit of Fig. 17 and to deliver them in three directions.

In Fig. 18 I have illustrated a device useful for reversing a carrier end for end while the carrier is in transit. This device consists of a housing 73 containing a platform 74 supported upon a pair of spring buffers 76 and held in position by pins 75 passing through holes in the wall of the housing.

This platform is disposed to one side of the path of carriers entering the housing 73 through the tube 72 so that when the head of a carrier engages the platform the weight and momentum of the carrier will cause the latter to topple over into the outlet 77 rear end foremost.

It is to be noted that the tube 71 in Fig. 18 forms a continuation of tube 71 in Fig. 17 and through this tube carriers pass from outlet 28 of the distributor 4 (of Figs. 7 to 11) to inlet 460 of a distributor 490. Carriers entering inlet 27 of the distributor 4 are sorted according to classes and delivered either to outlet 28 and through the tube 71 to the distributor 490 or through the outlet 29 and tube 69 to the distributor 49. The distributor 49 will sort the carriers according to classes and deliver one class through the outlet 48 to station A and carriers of other classes through outlet 47 into the tube 70, from which they pass to the inlet 461 of distributor 491. This distributor will sort these carriers and distribute them according to classes, either through outlet 480 to station E or outlet 470 to the tube or station C.

Carriers entering the distributor 490 will be selectively sorted and delivered either through outlet 470 to station F or through outlet 480 and tube 72 to the reversing device 73, the outlet 77, and the tube 78 to the inlet 270 of the distributor 400. This distributor sorts the carriers according to class and discharges them either into the outlet 280 to station B or through outlet 270 into the tube or station D.

The distributors 4 and 400 are of the type illustrated in Figs. 7 to 11 and adapted to separate recessed carriers from carriers of other types. The distributors 49, 490 and 491 are of the type shown in Figs. 12 to 16 and adapted to separate plugged carriers from carriers having flat or recessed heads. The operation of the above system of separating devices illustrated in Figs. 17 and 18 is substantially as follows:

A carrier having a flat head such as shown in Fig. 1, upon entering the inlet 27 will pass directly on and through outlet 29, the tube 69, and the inlet 46 into the distributor 49 and will be delivered through the outlet 48 to station A.

A carrier having a recessed head such as shown in Fig. 2, upon entering the inlet 27, will topple over into the outlet 28 and pass on through the tube 71 to the distributor 490. Here it will topple into the outlet 480 and thence pass through the reverser 73 and the tubes 77 and 78 to the inlet 270 of the distributor 400 which will topple the carrier through the outlet 280 and discharge it at station B.

Figure 3:
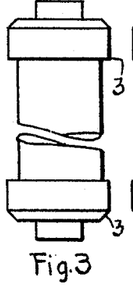

A plugged carrier such as shown in Fig. 3, upon entering the passage 27, will pass through tubes 29 and 69 to the distributor 49 which will discharge it through the outlet 47 into the tube 70. The carrier will then pass into the distributor 491 which will topple it into the outlet 470 leading to station C.

A carrier of the type shown in Fig. 4 having a flat head 1 at one end and a recessed head 2 at the other when entering the outlet 27, recessed end first, will topple over into outlet 28, and pass through tubes 71 and 460 to the distributor 490, flat head first. This will cause it to topple over into outlet 480 and pass the reversing device 73 which will deliver it flat end first into the distributor 400, by which it is delivered through outlet 290 to the station D.

If this same carrier enter inlet 27 flat end first it will pass through tubes 29, 69, and 46 to the distributor 49 which will eject it through the outlet 48 at the station A. Thus, a carrier of the type shown in Fig. 4 may be dispatched either to station D or station A according to which end is inserted first.

The carrier of Fig. 5 has a flat head 1 and a plugged head 3. If such a carrier enter inlet 27 plugged end first it will pass through the tubes 29, 69, and 46 and enter the distributor 49 which will eject it through the outlet 47 and cause it to land flat end first in the distributor 491. This distributor will eject the carrier through the outlet leading to the station E. If the carrier of Fig. 5 enter the inlet 27 flat head first it will be delivered to the distributor 49 flat head first and will topple into the outlet 48 and be ejected at station A.

The carrier shown in Fig. 6 has a recessed head 2 and a plugged head 3 so that if it enter inlet 27 recessed head first it will be ejected through the outlet 28 and passing through tubes 71 and 460 to distributor 490 will be ejected by the latter through the outlet 470 leading to station F.

If the latter carrier were to enter the passage 27 plugged end first it would be delivered plugged end first to distributor 49 when it would topple over and be delivered recessed end first to the distributor 491 which would eject it through outlet 480 at the station E.

While I have shown these distributors and the reversing device as separate units it is obvious that one or more of them may be assembled in one housing, but for manufacturing economy and to permit the ready assemblage of the distributors to meet varying requirements as to the number of stations to be served it is preferred to make the distributors as shown.

By referring particularly to Fig. 10 it will be clear that if two carriers arrive through the entrance 27 with too little interval between them, and if the first carrier be such that it will go straight on through to the outlet 29, the second carrier, regardless of its class, will probably follow the first, as the first carrier will have opened the gate 5 and may hold it open until the second carrier has entered the outlet 29. Furthermore if the first carrier be of a type which topples out through the outlet 28 it may interfere with and probably will jam the next carrier entering too closely behind it. Moreover, it is desirable to keep the outlets of the distributors clear of carriers, for if carriers accumulate at the outlets the distributors cannot function. It is thus desirable to provide means for spacing the carriers as they move through the system to insure proper operation of the distributing device.

Figures 19, 20, 21, 22, 23:
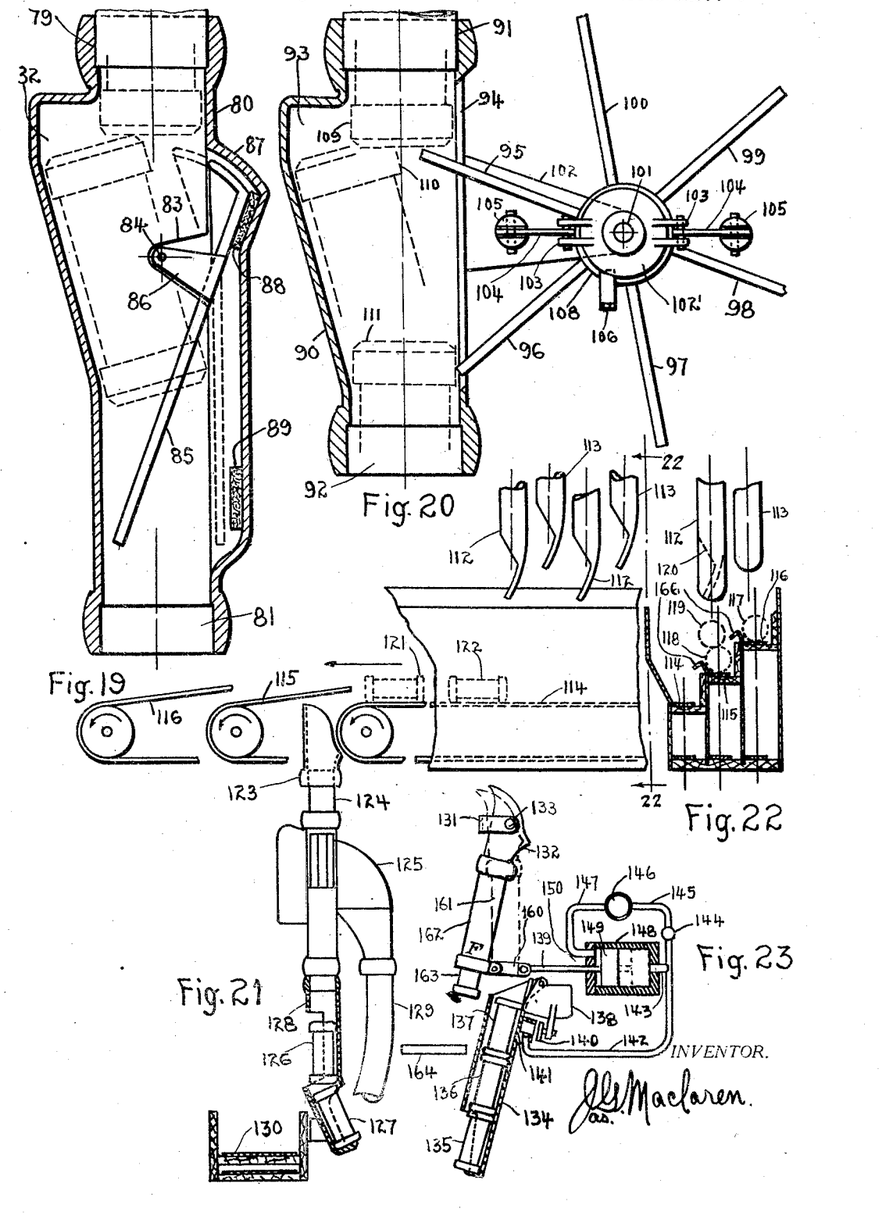
Fig. 19 is a vertical section illustrating one form of carrier spacing or checking device.
Fig. 20 is a side elevation, partly in section, illustrating a modified form of checking and spacing mechanism.
Fig. 21 is a fragmentary side elevation of one end of a distributing and receiving apparatus.
Fig. 22 is a vertical section substantially on the line 22—22 of Fig. 21.
Fig. 23 shows a modified form of carrier receiving devices which may be substituted for that shown in Fig. 21.

I have shown a desirable form of spacer in Fig. 19, the device there shown being intended to be interposed in the transmission line at a point in advance of the first distributing apparatus employed.

As illustrated in Fig. 19, the spacer comprises a housing 80 having an inlet passage at 79 and an outlet at 81 from which the transmission tube may lead directly to a distributor, as, for example, to the inlet 27 of the distributor shown in Figs. 7 to 10.

The passage 79 through the housing 80 is preferably circular in shape substantially to conform to the shape of the carriers with which it is to be employed. The casing 80 is provided at one side with an offset furnishing a recess 82 adapted to receive the upper end of a carrier when the latter is tilted as indicated in dotted lines in Fig. 19.

Directly opposite to the recess 82 a second recess 87 is provided, this recess being adapted to receive the upper or stop arm of a lever 85. This lever is provided with a pair of opposed ears, one on each side, seated depressions 83 in the side walls of the housing 87 and pivoted upon pins 84 projecting from the housing. The weight of the stop lever 85 is so distributed as to cause it normally to rest with its upper arm against the buffer or cushion 88. A similar buffer 89 is provided in the path of the lower end of the stop lever.

When a carrier enters the passage 79 it drops until it engages the lower arm of the stop lever, such arm normally extending in an oblique direction across the passage 79. Engagement of the carrier with this arm turns the stop lever on its pins 84 into the dotted position shown in Fig. 19, causing the upper or stop end of the lever to strike the upper part of the carrier and push the latter over into the recess 82 until it assumes the dotted line position shown in Fig. 19.

The carrier is now free to drop down through the passage 79 and out through the outlet 81. As the upper end of the carrier is swung over out of its normal position it provides a space between its head and the head of the following carrier into which the stop arm of the lever may enter, thus holding back such following carrier until the first carrier clears the lower end of the stop lever. The carriers are thus spaced sufficiently to permit a distributor to dispose of the first carrier before the following carrier can land in the distributor.

The stop lever 85, besides being weighted automatically to return to its normal position indicated by the solid lines, is pivoted to the left of the point of engagement of its stop member with a carrier, so that the weight of a carrier or carriers resting on the top end of the lever tends to swing the lever back to its normal position thus assisting the weight in performing this operation To permit the stop element of the lever to slip freely from beneath a carrier its upper face is preferably of arcuate contour struck on an arc about the axis of the pivot pins 84 as a center.

In Fig. 20 I have shown an alternative arrangement for spacing carriers prior to their entering the distributor. Such arrangement comprises retarding or timing means for checking each carrier until sufficient time has elapsed for the first or preceding carrier to have passed through the distributor gate or cradle as the case may be.

This modified form of spacer comprises a housing 90 conforming to the shape of the carriers and having an inlet 91 and an outlet 92, the latter being adapted for connection to a distributor. One side of the housing 90 is provided with a recess 93 into which the upper part of a carrier may be tipped as indicated in dotted lines in Fig. 20. Opposite to the recess 93 the housing 90 is provided with a vertical slot 94 through which the ends or arms 95, 96, 97, 98, 99 and 100 may in turn enter the housing.

These arms project radially from a shaft 101 which revolves in and is supported by a pair of ears 102 projecting from the housing 90. Secured to the shaft 101 is a hinge plate 102' to which toggle arms 104 are hinged at 103. At their outer ends the toggle arms are hinged respectively to the weights 105 from which corresponding toggle arms are shown extended to a friction plate 108 which is free to slide axially along the shaft 100. This arrangement thus forms a centrifugal friction governor such as is commonly used in phonographs. If the arms 95, 96, etc. are revolved, the weights 105 will also be revolved, and by their centrifugal action exert a pull on the toggles 104, thereby moving the plate 108 toward the hinge plate 102' and into frictional contact with an abutment 106 extending from and supported by one of the ears 102.

When a carrier 109 enters the inlet 91 it engages one of the radial arms, for example the arm 95, and the weight and force of the carrier will turn the shaft 101 as rapidly as the governor adjustment will permit, thus moving the arm 95 into the position in which the arm 96 is illustrated, and bringing the arm 100 into the position in which the arm 95 is shown. The end of the arm 100 will thus strike the upper end of the carrier and push it over into the recess 93 as shown in dotted lines at 110 From this position the carrier is free to drop and pass out through the opening 92 as indicated in dotted lines at 111. However, one arm is always positioned in the path of the succeeding carriers so that each carrier in turn is timed in its passage between the inlet opening 91 and the outlet opening 92, thereby providing the proper space between successive carriers for operation of the distributing mechanism.

A further spacing and distributing mechanism is shown in Figs. 21 and 22. This arrangement is particularly designed to receive carriers from a battery of incoming tubes or terminals and for spacing them for passage through the distributor, and may include means for automatically clearing the outlet end of the distributing device employed.

The delivery terminals and chutes 112 and 113 through which carriers arrive are shown as arranged in parallel rows as indicated in Fig. 22. The terminals of the respective rows discharge either directly or indirectly onto moving conveyor belts 114, 115 and 116. Under some conditions certain of the delivery terminals may deliver an excessive number of carriers and in that event such terminal or terminals may be rotated or turned to a position such as indicated in dotted lines at 120 in Fig. 22 so as to deliver onto a different belt. The belts are driven by means of pulleys turning in the direction indicated by the arrows and actuated by a motor or other means suitable for moving belts.

The several belts together with the delivery terminals may form part of a central station desk apparatus or be located at any other desired part of the conveyor system. Preferably I arrange the upper runs of the several conveyor belts 114, 115, 116 etc., in trough-like or parallel guideways disposed in stepped relation so that if while carriers 117 and 118 are in transit additional carriers such as the carrier 119 should be delivered through the terminals 112 and 113, such a carrier 119, landing upon the top of one of the first carriers, will roll down onto the next lower belt. To ensure this action, the center lines of the delivery terminals are slightly staggered relatively to the center lines of the belts so that a following carrier will land upon the down hill side of a carrier already resting upon an upper belt.

The carriers move along upon the belts substantially in the positions indicated by dotted lines 121 and 122. Obviously they will be close together or separate as may happen. At the end of each belt is a hopper 123 (but one being shown) through which carriers pass to a corresponding tube 124 and thence to a distributor 125 which selectively sorts them for further transit through a tube 129 or lands them in a delivery receptacle 128. The speed of the moving belt is such that when a carrier 121 is delivered into the hopper 123, sufficient time will elapse before a following carrier 122 is delivered onto the hopper for the first carrier to have passed through the distributor 125 or at least to have cleared the gate or cradle in the distributor.

The carrier will normally come to rest in the receptacle 128 in the position indicated at 127. If such carrier is not removed from the receptacle before the arrival of a second carrier 126 this latter carrier, landing upon the first carrier which forms an obstruction and contacts with the second carrier at a point to one side of the center of gravity of the latter, will topple out of a delivery opening in the rear of the receptacle onto a suitable receiver, for example a movable belt 130 for transmission to another attendant than the one handling carriers occupying the position 127.

If the attendant whose duty it is to take carriers from the position 127 should wish to leave the station, a dummy carrier can be put in the position 127 so that all further carriers arriving in the receptacle will topple out through the rear opening onto the belt 130 and be carried thereby to another attendant.

An alternative arrangement for clearing the discharge end of a distributor is illustrated in Fig. 23. This device comprises a rigid bracket 131 which pivotally supports a hopper 132 mounted to swing upon the pins 133 and adapted to be substituted for the part 128 above described. This hopper normally occupies the dotted line position shown in Fig. 23 so that carriers received therein will be delivered through the tube 161, which forms a part or continuation of the hopper 132, into the receptacle 134. Successive carriers deposited in the receptacle will assume the position indicated at 135, 136, and 137 respectively.

The uppermost carrier, occupying the position 137, will engage a valve lever 138 which is pivoted on the pin 139 and which carries a valve 140. This valve will thus be lifted from its seat thereby opening a chamber 141 to the atmosphere. The lever 138 is counter-weighted so that when there is no carrier in the position 137 the lever 138 will occupy a position in which the valve 140 will be seated, thereby sealing the chamber 141.

A tube 142 leads from the chamber 141 and is connected by a pipe 143 to one end of a cylinder 148. The tube 142 is also connected through a valve 144 and pipe 145 to the header 146 in which is maintained a pressure equal to that in the pneumatic despatch tube system. For illustrative purposes the system is assumed to be of vacuum type so that the pressure in the header 146 is less than that of the atmosphere.

The header 146 is also connected to the opposite end of the cylinder 148 by a pipe 147. Within the cylinder is a piston rod 150 connected by a link 160 to the tube 161.

The receptacle 134 being full of carriers, the valve 140 will be off of its seat and air at atmospheric pressure will enter through the chamber 141, the tube 142, and the pipe 143, and will thus gain access to the cylinder 148 faster than it can be exhausted through the valve 144 which will have been adjusted to a nearly closed position.

The piston 149 will therefore be under pressure and will move to the left and push the tube 161 over from the dotted line position to the full line position 162 and hold it there so long as a carrier remains at 137. Under these circumstances further carriers arriving through the tube 161 will be delivered as indicated at 163 at a point such that they will fall onto a shelf, belt, or other receiver such as 164.

When the lowermost carrier 135 is removed from the receptacle 134 the upper carrier will drop and thus release the lever 138 which will immediately close the valve 140. The weight of the parts 161 and 132 will return them to their normal position and push back the piston 149, the air between the piston and the cylinder heads by-passing through the pipes 145 and 147.

While I have herein shown and described specific forms or embodiments of my invention for illustrative purposes and have disclosed and discussed in detail the construction and arrangement incidental to applications thereof, it is to be understood that the invention is limited neither to the mere details or relative arrangements of parts nor to the specific embodiments herein shown, but that extensive deviation from the illustrated forms and embodiments of the invention may be made without departing from the principles thereof.

I claim:

1. In a carrier distributor, a one piece gate normally disposed in the path of carriers and movable by carriers of one class to deliver them into one distributor outlet and movable by carriers of another class to deliver them into another outlet.

2. In a carrier distributor, a gate in the path of a carrier traveling therethrough hinged to be moved by said carrier, and retarding means for controlling said gate during a portion of its movement so that a carrier striking said gate is deflected therefrom.

3. In a carrier distributor having a passage therethrough for carriers and a branch outlet for carriers, a hinged gate extending into the path of traveling carriers, said gate being movable by a carrier striking the same, and retarding means for controlling the movement of the said gate effective while the carrier is being deflected by said gate.

4. In a carrier distributor having a passage therethrough for carriers and a branch outlet for carriers, a hinged gate extending into the path of traveling carriers, said gate being movable by impact of a carrier thereagainst, and retarding means for controlling the movement of said gate effective while a carrier is being toppled therefrom into the branch outlet.

5. In a carrier distributor having a passage therethrough for carriers and a branch outlet for carriers, a hinged gate extending into the path of traveling carriers, said gate being movable by a carrier engaging it, and retarding means for controlling the movement of said gate effective while a carrier is being toppled therefrom by gravity into a branch outlet.

6. In a carrier distributor, a pivoted gate extending into the path of traveling carriers, and means for normally holding said gate in said path and for momentarily retarding the movement of said gate when engaged by a carrier, and an outlet to receive carriers toppled from said gate.

7. In a carrier distributor, a gate in the path of a carrier traveling therethrough, said gate being hinged and movable by a carrier, retarding means for controlling said gate during that portion of its movement at which a carrier resting on said gate is deflected therefrom, and means for releasing said retarding means after the gate has been engaged by a carrier for more than said portion of movement.

8. In a carrier distributor having an entrance for carriers and outlets for same, a gate normally in the path of carriers entering said distributor and movable by said carriers, the said gate having a projection positioned to be straddled by a recessed carrier and engaged by an unrecessed carrier to one side of its axis whereby to tilt the latter type of carrier in a direction such as to prevent it from being deflected or toppled from said gate while entering one of the distributor outlets, the recessed carriers being tilted by said gate into another of the distributor outlets.

9. In a carrier distributor having an entrance for carriers and outlets for same, a gate normally in the path of carriers entering said distributor and movable by said carriers, the said gate having a projection positioned to be straddled by recessed carriers and engaged by other carriers to one side of its respective axes to tilt the latter in a direction such as to prevent their being deflected or toppled from said gate while entering one of the distributor outlets, and means for retarding the movement of said gate whereby recessed carriers are toppled from said gate into another distributor outlet.

10. In a carrier distributor having an entrance for carriers and outlets for same, a gate normally in the path of carriers entering said distributor and movable by said carriers, the said gate having a projection that will be straddled by recessed carriers and engaged at a point to one side of its axis by a plugged or flat carrier or a carrier with a shallow recess, to tilt the latter in a direction to prevent its being deflected or toppled from said gate.

11. In a carrier sorting device for pneumatic despatch systems, a pivotally mounted arm extending into the path of travel of the carriers and having a conformation such as to be engaged at different distances from the pivot point by the different classes of carriers, and the inertia of the arm being such that carriers engaging the arm at points relatively distant from the pivot point will rock the arm and continue their course of travel while carriers engaging the arm at points less distant from the pivot point will rock the arm to only a slight extent and will accordingly be diverted from the path of travel.

12. In a carrier sorting device for pneumatic despatch systems in which carriers having recessed ends and carriers having non-recessed ends are used, a pivotally mounted arm normally extending across the path of travel of the carriers and having a projection arranged to be engaged by the end of a non-recessed carrier or to enter the recess in the end of a recessed carrier, the position of the projection with relation to its distance from the pivot point and the inertia of the arm being such that the arm will yield when engaged by one of the two classes of carriers but will remain substantially in position when engaged by the other class to thereby divert the carriers from the normal path of travel and perform a selecting operation.

13. In a carrier sorting device for pneumatic despatch systems in which carriers having recessed ends and carriers having non-recessed ends are used, a pivotally mounted weighted arm normally extending across the path of travel of the carriers and having a projection arranged to be engaged by the ends of a non-recessed carrier or to enter the recess in the end of a recessed carrier, the projection being positioned at a distance from the pivot point of the arm such as will cause the arm to rock when the projection is engaged by a non-recessed carrier to permit the carrier to continue in the normal path of travel, the point of engagement of a recessed carrier with the arm being relatively nearer the pivot point so that the arm is not substantially rocked before the recessed carrier is diverted from its path of travel by the arm.

14. In a carrier distributing apparatus, a plurality of separators connected by interposed sections of transmission tube, one of said separators being adapted to separate carriers having recessed heads from carriers having plugged or flat heads, and another of said separators being adapted to separate carriers of the two latter kinds.

15. In a carrier distributing apparatus a plurality of separator devices adapted respectively to separate carrier of different classes from each other, and a device for reversing carriers end for end, the several devices being connected by sections of transmission tube to form a pathway for carriers.

16. In a carrier distributing apparatus a plurality of connected separators, said separators being of two kinds, separators of one kind being adapted to separate carriers whose advancing ends are recessed from carriers whose advancing ends are flat or plugged, and the other kind being adapted to separate carriers whose advancing ends are flat from those whose advancing ends are plugged, said apparatus comprising a separator of the first kind followed on one side by two successive separators of the second kind and followed on the other side by a separator of the second kind, a device for reversing carriers end for end, and a further separator of the first kind.

17. In a carrier distributor, a one piece gate pivoted to swing in a vertical plane comprising a part normally projecting into the path of carriers and movable out of said path by carriers of one class to permit them to continue along their normal path and acting as an abutment to topple carriers of another class from said path, and means exterior to said path effective to prevent movement of the gate out of said path when impacted by carriers of the latter class.

18. In a carrier distributor, a pivoted one piece gate having a part thereof normally disposed in the path of carriers and movable out of said path by carriers of a certain class, and a counterweight disposed outside of the path of carriers and connected to the gate thereby adding to the effective mass of the latter to retard its response to impact by a carrier.

19. Carrier distributing apparatus comprising a carrier transmission tube having a lateral discharge opening, a one piece gate normally projecting into the tube and pivoted to turn about an axis disposed at the opposite side of the tube from said opening, the axis of the gate lying in a plane above the horizontal plane of its center of gravity, said gate being movable downwardly and out of the tube under impact of carriers of a certain class, and a counterweight tending to hold the gate in normal operative position.

20. In a carrier distributor having a passage therethrough for carriers and a lateral outlet for carriers a lever pivoted to swing about a substantially horizontal axis disposed at the opposite side of the passage from said lateral outlet, the lever when in operative position extending into the passage, the lever having a lug projecting toward approaching carriers, said lug being disposed eccentrically with respect to the axis of the passage, and a counterweight disposed outside of the passage adapted normally to maintain the lever in operative position.

21. In a carrier distributor having a passage therethrough for carriers and a lateral outlet for carriers a lever pivoted to swing about a substantially horizontal axis disposed at the opposite side of the passage from said lateral outlet, the lever when in operative position extending into the passage, the lever having a lug projecting toward approaching carriers, said lug being disposed nearer to that side of the passage having the lateral discharge opening than to the opposite side thereof, and a counterweight exterior to the passage connected to the lever tending to hold that portion of the lever which projects across the passage in operative carrier engaging position.

22. A carrier sorting device for pneumatic despatch tubes comprising a tube section having an outlet port in one side thereof, a lever pivoted to swing about an axis disposed outside of the tube section, said lever having an arm disposed outside of the tube section, a weight rigidly secured to said arm, and a second arm disposed within the tube section, said latter arm having a part adapted to enter the recess of a recessed head carrier passing along the tube section, said second arm when engaged by a carrier having a non-recessed head swinging downwardly to allow the carrier to pass thereby lifting the weighted arm.

23. A carrier sorting device for pneumatic despatch systems comprising a guide tube having an outlet port in one side thereof, and a one piece counterweighted lever having an arm normally projecting into the carrier path at a point adjacent to the lower end of said port, said arm acting as an abutment to retard carriers of a certain configuration and thereby to cause such retarded carriers to pass out through the outlet port, said abutment swinging to permit other carriers to continue on along the tube.

24. A carrier sorting device for pneumatic despatch tubes comprising a tube section having an outlet port at one end and an outlet port in one side thereof, an arm pivoted on said section and extending into the path of travel of carriers passing into the section, said arm being arranged to engage the recess in the end of a recessed carrier to interrupt the travel of the carrier and cause the same to topple through the outlet in the side of said section.

25. A carrier sorting device for pneumatic despatch tubes comprising a top section having an outlet port at one end and an outlet port in one side wall thereof, a weighted arm pivoted on said section adjacent to the lower end of said outlet in said side wall, said arm being arranged to engage the recess in the end of a recessed carrier and thereby causing the carrier to topple outwardly through the adjacent recess in said side wall while a non-recessed carrier will swing the arm about its pivot and pass through the outlet port in the end of the section.

In testimony whereof I have affixed my signature.

JAMES G. MACLAREN.

Certificate of Correction.

It is hereby certified that in Letters Patent No. 1,585,302, granted May 18, 1926, upon the application of James G. Maclaren, of Mamaroneck, New York, for an improvement in "Carrier Distributors," an error appears in the printed specification requiring correction as follows: Page 9, line 8, claim 14, for the words " decessed beads " read *recessed heads;* and that the said Letters Patent should be read with this correction therein that the same may conform to the record of the case in the Patent Office.

Signed and sealed this 15th day of June, A. D. 1926.

[SEAL.]

M. J. MOORE,
*Acting Commissioner of Patents.*